United States Patent

Halasa et al.

Patent Number: 5,665,826
Date of Patent: Sep. 9, 1997

[54] PNEUMATIC TIRE

[75] Inventors: Adel Farhan Halasa, Bath; Laurie Elizabeth Austin, Hartville; Susan Ann Weakland, Akron, all of Ohio

[73] Assignee: The Goodyear Tire & Rubber Company, Akron, Ohio

[21] Appl. No.: 732,579

[22] Filed: Oct. 15, 1996

Related U.S. Application Data

[62] Division of Ser. No. 505,441, Jul. 21, 1995, Pat. No. 5,623,035.

[51] Int. Cl.$^6$ .................... C08L 9/00; C08K 3/36
[52] U.S. Cl. ............ 525/237; 525/332.9; 524/575; 526/340; 152/209 R; 152/450; 152/564
[58] Field of Search ................ 525/237, 332.9; 524/575, 492, 495; 526/340, 183; 152/209 R, 450, 564

[56] References Cited

U.S. PATENT DOCUMENTS

| | | | |
|---|---|---|---|
| 4,477,621 | 10/1984 | Sato et al. | 524/575 |
| 4,519,430 | 5/1985 | Ahmad et al. | 524/575 |
| 4,914,147 | 4/1990 | Mouri et al. | 525/237 X |
| 5,447,971 | 9/1995 | Bergh et al. | 525/237 X |

*Primary Examiner*—Fred Teskin
*Attorney, Agent, or Firm*—Alvin T. Rockhill

[57] ABSTRACT

The subject invention relates to an anionic polymerization technique for synthesizing rubbery polymers of conjugated diolefin monomers, such as an rubbery copolymer of α-methylstyrene and 1,3-butadiene. These rubbery copolymers exhibit an excellent combination of properties for utilization in tire tread rubber compounds. They have high trans-isomer contents which leads to good treadwear characteristics and a broad molecular weight distribution which enhances processability. This invention more specifically discloses a process for the synthesis of rubbery polymers which have a broad molecular weight distribution and which are particularly useful in tire tread rubber compounds, said process comprising the polymerization of at least one conjugated diolefin monomer in an organic solvent in the presence of a catalyst system which is comprised of (a) a dialkyl magnesium compound and (b) an alkali metal containing compound selected from the group consisting of alkali metal alkoxides, alkali metal phenoxides, alkali metal sulfoxides, alkali metal sulfonates, alkali metal carboxylates, alkyl substituted alkali metal phenoxides, alkali metal alkylamines, and alkali metal dialkylamines; wherein the molar ratio of the alkali metal containing compound to the dialkyl magnesium compound is within the range of about 6:1 to about 1:5. In cases where rubbery copolymers containing α-methylstyrene are being synthesized the alkali metal in the alkali metal containing compound will normally be potassium, rubidium, or cesium with cesium being most preferred.

19 Claims, No Drawings

PNEUMATIC TIRE

This is a Divisional of application Ser. No. 08/505,441, filed on Jul. 21, 1995, now U.S. Pat. No. 5,623,035.

BACKGROUND OF THE INVENTION

Polybutadiene rubbers having glass transition temperatures of about −95° C. can be made by anionic polymerization with alkyl lithium initiators. Such polybutadiene rubbers generally have a narrow molecular weight distribution and a high cis-isomer content. The processability of such rubbers is not optimal by virtue of their narrow molecular weight distribution. Additionally, tire treadwear characteristics could be improved by increasing the level of trans-isomer content in the rubber.

Copolymers of α-methylstyrene and 1,3-butadiene are normally made by emulsion polymerization. Such emulsion polymerizations generally result in a high degree of branching in the α-methylstyrene/butadiene rubber which leads to a high level of hysteresis. This is undesirable in tire tread rubber compounds because high hysteresis causes poor rolling resistance characteristics.

Alpha-methylstyrene does not usually homopolymerize or copolymerize with conjugated diene monomers at temperatures above about 60° C. (the ceiling temperature of α-methylstyrene polymerization). This compounded by the fact that conjugated diolefin monomers normally polymerize at a much faster rate than α-methylstyrene, has precluded the synthesis of such copolymers by solution polymerization on a commercial basis.

Higher temperatures generally promote a faster rate of polymerization. Accordingly, it is desirable to utilize moderately high temperatures in commercial polymerizations in order to maximize throughputs. However, it has traditionally been virtually impossible to copolymerize α-methyl styrene with conjugated diolefin monomers at temperatures above about 60° C. At temperatures below 60° C. polymerizations have not proven to be commercially viable due to low polymerization rates and low conversion levels.

SUMMARY OF THE INVENTION

It has been unexpectedly found that polybutadiene rubbers having a trans-isomer content of 30 percent to 45 percent and a broad molecular weight distribution can be synthesized by anionic polymerization utilizing the catalyst system and techniques of this invention. These polybutadiene rubbers can be processed in standard commercial equipment even at Mooney viscosities of over 100. Such polybutadiene rubbers can be employed in tire tread compounds which exhibit both improved processability and improved wear characteristics. Polymers of this type can also be employed as viscosity modifiers for lubricating oils, such as automotive motor oils.

A wide variety of additional rubbery polymers can be synthesized utilizing the catalyst system and techniques of this invention. Styrene-butadiene rubber (SBR), styrene-isoprene-butadiene rubber (SIBR), and isoprene-butadiene rubber (IBR) having a high trans content and a broad molecular weight distribution can be made. Styrene-isoprene rubber (SIR) having a broad molecular weight distribution and accordingly good processability can also be synthesized.

The catalyst system of this invention has the unique ability to copolymerize α-methylstyrene and 1,3-butadiene at temperatures above 60° C. to high levels of conversion in solution. For instance, α-methylstyrene can be copolymerized with conjugated diolefin monomers at temperatures which are within the range of 20° C. to about 100° C. In cases where potassium alkoxide containing catalyst systems are employed α-methylstyrene monomer conversions of up to about 85 percent can be attained. Alpha-methylstyrene monomer conversions of virtually 100 percent can be achieved in cases where cesium alkoxide or rubidium alkoxide containing catalyst systems are used.

The subject invention more specifically discloses a process for the synthesis of rubbery polymers which have a broad molecular weight distribution and which are particularly useful in tire tread rubber compounds or viscosity modifiers, said process comprising the polymerization of at least one conjugated diolefin monomer in an organic solvent in the presence of a catalyst system which is comprised of (a) a dialkyl magnesium compound and (b) an alkali metal containing compound selected from the group consisting of alkali metal alkoxides, alkali metal phenoxides, alkali metal sulfoxides, alkali metal sulfonates, alkali metal carboxylates, alkyl substituted alkali metal phenoxides, alkali metal alkylamines, and alkali metal dialkylamines; wherein the molar ratio of the alkali metal containing compound to the dialkyl magnesium compound is within the range of about 6:1 to about 1:5.

The subject invention also reveals a process for the synthesis of rubbery copolymers of α-methylstyrene and 1,3-butadiene which have a broad molecular weight distribution and which are particularly useful in tire tread rubber compounds, said process comprising the copolymerization of α-methylstyrene monomer and 1,3-butadiene monomer in an organic solvent at a temperature which is within the range of about 60° C. to about 100° C. in the presence of a catalyst system which is comprised of (a) a dialkyl magnesium compound, (b) a potassium alkoxide containing from about 2 to about 12 carbon atoms, and (c) a polar modifier; wherein the molar ratio of the potassium alkoxide to the dialkyl magnesium compound is within the range of about 6:1 to about 1:5, and wherein the molar ratio of the polar modifier to the dialkyl magnesium compound is within the range of about 10:1 to about 1:2.

The subject invention further discloses a process for the synthesis of rubbery copolymers of α-methylstyrene and 1,3-butadiene which have a broad molecular weight distribution and which are particularly useful in tire tread rubber compounds, said process comprising the copolymerization of α-methylstyrene monomer and 1,3-butadiene monomer in an organic solvent at a temperature which is within the range of about 60° C. to about 100° C. in the presence of a catalyst system which is comprised of (a) a dialkyl magnesium compound; (b) an alkali metal alkoxide containing from about 2 to about 12 carbon atoms, wherein the alkali metal in the alkali metal alkoxide is selected from the group consisting of rubidium and cesium; and (c) a polar modifier; wherein the molar ratio of the alkali metal alkoxide to the dialkyl magnesium compound is within the range of about 6:1 to about 1:5, and wherein the molar ratio of the polar modifier to the dialkyl magnesium compound is within the range of about 10:1 to about 1:2.

The present invention also reveals a catalyst system which is particularly useful in the polymerization of conjugated diolefin monomers into rubbery polymers, said catalyst system being comprised of (a) a dialkyl magnesium compound; (b) an alkali metal alkoxide containing from about 2 to about 12 carbon atoms, wherein the alkali metal in the alkali metal alkoxide is selected from the group consisting of sodium, potassium, rubidium and cesium; and (c) a polar modifier; wherein the molar ratio of the potassium alkoxide to the dialkyl magnesium compound is within the range of about 6:1 to about 1:5, and wherein the molar ratio of the polar modifier to the dialkyl magnesium compound is within the range of about 10:1 to about 1:2.

The present invention further discloses a process for the synthesis of rubbery polymers which have a broad molecular weight distribution and which are particularly useful in tire tread rubber compounds, said process comprising the polymerization of at least one conjugated diolefin monomer in an organic solvent in the presence of a catalyst system which is comprised of a radical anion of an alkali metal selected from the group consisting of potassium, rubidium, and cesium; wherein the radical anion is dissolved in a polar medium which contains at least one aromatic compound. Radical anions of alkali metals can be made by dissolving the alkali metal in a polar solvent, such as tetrahydrofuran or triethylamine, at the temperature of about −70° C. Such radical anions of alkali metals are typically made by dissolving the alkali metal in the presence of an aromatic compound at a temperature which is within the range of about −60° C. to about −90° C. Temperatures which are within the range of about −65° C. to about −75° C. are preferred for preparation of the radical anion.

A wide variety of aromatic compounds can be employed to dissolve the radical anion. Some representative examples of aromatic compounds which can be used include: benzene, toluene, naphthalene, pentalene, indene, as-indacene, s-indacene, azulene acenaphthylene cumene, cymene, mesitylene, xylene, pentacene, hexacene, phenalene, phenanthrene, hexaphene, anthracene, fluoranthene, acephenanthrylene, aceanthrylene, rubicene, triphenylene, chrysene, naphthacene, picene, perylene, pentaphene, perylene, pentaphene, and tetraphenylene. It is preferred for the aromatic compound to be a polynuclear aromatic compound (an aromatic compound which has more than one aromatic ring), such as naphthalene, anthracenenaphthacene, or heptacene. The moral ratio of the radical anion to the aromatic compound will normally be within the range of about 1:5 to about 1:25. It is generally preferred for the molar ratio of the radical anion to the aromatic compound to be within the range of about 1:8 to about 1:15. It is normally most preferred for the molar ratio of the radical anion to the aromatic compound to be about 1:10. The alkali metal will normally be selected from the group consisting of sodium, potassium, rubidium, and cesium. Potassium, rubidium and cesium are preferred with cesium being most preferred.

DETAILED DESCRIPTION OF THE INVENTION

The polymerizations of the present invention which are carried out in a hydrocarbon solvent which can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

In solution polymerizations which utilize the catalyst systems of this invention, there will normally be from 5 to 35 weight percent monomers in the polymerization medium. Such polymerization mediums are, of course, comprised of an organic solvent, monomer, and the catalyst system. In most cases it will be preferred for the polymerization medium to contain from 10 to 30 weight percent monomers. It is generally more preferred for the polymerization medium to contain 20 to 25 weight percent monomers.

The catalyst systems of this invention can be used to homopolymerize conjugated diolefin monomers or to copolymerize conjugated diolefin monomers with vinyl aromatic monomers. It is also, of course, possible to polymerize a mixture of conjugated diolefin monomers with one or more vinyl aromatic monomers. Some representative examples of rubbery polymers which can be synthesized with the catalyst systems of this invention include polybutadiene, styrene-butadiene rubber (SBR), α-methylstyrene-butadiene rubber, styrene-isoprene-butadiene rubber (SIBR), styrene-isoprene rubber (SIR), isoprene-butadiene rubber (IBR), α-methylstyrene-isoprene-butadiene rubber, and α-methylstyrene-styrene-isoprene-butadiene rubber.

The conjugated diolefin monomers which are utilized in the synthesis of the rubbery polymers of this invention generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture. Some representative examples of vinyl aromatic monomers which can be used include styrene, 1-vinylnaphthalene, 2-vinylnaphthalene, α-methylstyrene, 4-phenylstyrene, 3-methylstyrene, and the like.

The catalyst systems utilized in practicing the subject invention are comprised of a dialkyl magnesium compound, an alkali metal containing compound, and optionally a polar modifier. The dialkyl magnesium compound will generally be of the formula: $MgR_2$ wherein R represents an alkyl group which contains from 1 to about 12 carbon atoms. The alkyl groups in the dialkyl magnesium compound will normally contain from 2 to about 6 carbon atoms. Dibutylmagnesium is a highly preferred dialkylmagnesium compound.

The alkali metal containing compound employed in the catalyst systems of this invention is selected from the group consisting of alkali metal alkoxides, alkali metal phenoxides, alkali metal sulfoxides, alkali metal sulfonates, alkali metal carboxylates, alkyl substituted alkali metal phenoxides, alkali metal alkylamines, and alkali metal dialkylamines. Alkali metal alkoxides are the preferred type of alkali metal containing compound for use in the catalyst systems of the present invention.

The alkali metal in the alkali metal containing compound of the catalyst system will be selected from the group consisting of sodium, potassium, rubidium, and cesium. In cases where α-methylstyrene containing copolymers are being synthesized the alkali metal will be selected from potassium, rubidium, and cesium. It is preferred for the alkali metal in the alkali metal containing compound to be rubidium or cesium in cases where copolymers containing α-methylstyrene are being synthesized because higher conversions can be attained and because higher levels of α-methylstyrene can be incorporated into the copolymer.

It is typically most preferred for the alkali metal in the catalyst system to be cesium in cases where copolymers containing α-methylstyrene are being made. For instance, an α-methylstyrene monomer conversion of virtually 100 percent can be attained in cases where cesium containing catalyst systems are employed. In cases where potassium containing catalyst systems are used α-methylstyrene monomer conversions are generally limited to a maximum of about 85 percent. Cesium containing catalyst systems can also be used to synthesize copolymers which contain up to about 50 percent α-methylstyrene monomer. This is in contrast to potassium containing catalyst systems which limit the amount of α-methylstyrene which can be incorporated into a copolymer to about 25 percent.

The alkali metal alkoxides which can be utilized in the catalyst system will normally be of the formula MOR, wherein M represents an alkali metal selected from the group consisting of sodium, potassium, rubidium, and cesium, and wherein R is an alkyl group containing from about 2 to about 12 carbon atoms. The alkali metal alkoxide will typically contain from about 2 to about 12 carbon atoms. It is generally preferred for the alkali metal alkoxide to contain from about 3 to about 8 carbon atoms. It is generally most preferred for the alkali metal alkoxide to contain from about 4 to about 6 carbon atoms. Alkali metal t-pentoxides, such as sodium t-amyloxide (sodium t-pentoxide), potassium t-amyloxide (potassium t-pentoxide), rubidium t-amyloxide (rubidium t-pentoxide), and cesium t-amyloxide (cesium t-pentoxide), are representative examples of preferred alkali metal alkoxides which can be utilized in the catalyst systems of this invention. Cesium t-amyloxide and rubidium t-amyloxide are the most highly preferred alkali metal alkoxides for utilization in synthesizing copolymers containing α-methylstyrene with cesium t-amyloxide being the most preferred.

The alkali metal phenoxides which can be utilized in the catalyst system will normally be of the formula MO-φ, wherein M represents an alkali metal selected from the group consisting of sodium, potassium, rubidium, and cesium, and wherein φ represents a phenyl group. Rubidium phenoxide and cesium phenoxide are preferred alkali metal phenoxides with cesium phenoxide being the most preferred.

Substituted alkali metal phenoxides can also be employed in the catalyst systems of this invention. In such substituted alkali metal phenoxides from 1 to 5 of the hydrogen atoms on the phenyl group will be substituted with alkyl groups which contain from 1 to about 10 carbon atoms.

The alkali metal sulfoxides which can be used are of the structural formula $M_2SO$, wherein M represents an alkali metal selected from the group consisting of sodium, potassium, rubidium, and cesium. The alkali metal sulfonates which can be used are of the structural formula $M-SO_3H$, wherein M represents an alkali metal selected from the group consisting of potassium, rubidium, and cesium. The alkali metal carboxylates which can be used are of the structural formula $M-COOH$, wherein M represents an alkali metal selected from the group consisting of sodium, potassium, rubidium, and cesium.

The alkali metal alkylamines which can be utilized in the catalyst systems of this invention can be tertiary amines of the formula $M_2NR$ or secondary amines of the formula MNHR, wherein M represents an alkali metal selected from the group consisting of sodium, potassium, rubidium, and cesium, and wherein R is an alkyl group containing from about 2 to about 12 carbon atoms. The alkali metal alkylamine will typically have alkyl groups which contain from about 2 to about 12 carbon atoms. It is generally preferred for the alkali groups in the alkali metal alkylamine to contain from about 3 to about 8 carbon atoms.

The alkali metal dialkylamines which can be utilized in the catalyst systems of this invention are tertiary amines of the formula $MNR_2$, wherein M represents an alkali metal selected from the group consisting of sodium, potassium, rubidium, and cesium, and wherein R represents alkyl group containing from about 2 to about 12 carbon atoms which can be the same or different. The alkali metal diaikylamine will typically have alkyl groups which contain from about 2 to about 12 carbon atoms. It is generally preferred for the alkali groups in the alkali metal dialkylamine to contain from about 3 to about 8 carbon atoms.

Ethers and tertiary amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine (TMEDA), N-methyl morpholine, N-ethyl morpholine, N-phenyl morpholine and the like. Dipiperidinoethane, dipyrrolidinoethane, tetramethylethylene diamine, diethylene glycol, dimethyl ether, TMEDA and tetrahydrofuran are representative of highly preferred modifiers. Tertiary chelating alkyl 1,2-ethylene diamines, such as TMEDA, are the most preferred polar modifiers.

The molar ratio of the alkali metal containing compound to the dialkyl magnesium containing compound will be with in the range of about 6:1 to about 1:5. It is preferred for the molar ratio of the alkali metal containing compound to the dialkyl magnesium containing compound will be with in the range of about 4:1 to about 1:2. It is more preferred for the molar ratio of the alkali metal containing compound to the dialkyl magnesium containing compound will be with in the range of about 3:1 to about 1:1. It is most preferred for the molar ratio of the alkali metal containing compound to the dialkyl magnesium containing compound will be with in the range of about 5:2 to about 3:2.

In cases where a polar modifier is utilized, such as in the synthesis of copolymers containing α-methylstyrene, the molar ratio of the polar modifier to the dialkyl magnesium containing compound will be with in the range of about 10:1 to about 1:2. It is preferred for the molar ratio of the polar modifier to the dialkyl magnesium containing compound will be with in the range of about 6:1 to about 1:1. It is more preferred for the molar ratio of the polar modifier to the dialkyl magnesium containing compound will be with in the range of about 3:1 to about 3:2. It is most preferred for the molar ratio of the polar modifier to the dialkyl magnesium containing compound will be with in the range of about 5:2 to about 2:1.

The polymerization temperature utilized can vary over a broad range of from about 60° C. to about 100° C. In most cases a temperature within the range of about 62° C. to about 80° C. will be utilized. Temperatures within the range of about 65° C. to about 75° C. are generally the most preferred polymerization temperatures. The pressure used will normally be sufficient to maintain a substantially liquid phase under the conditions of the polymerization reaction.

The polymerization is conducted for a length of time sufficient to permit a maximum monomer conversion to be attained in other words, the polymerization is normally carried out until high conversions are attained. In the case of potassium alkoxide containing catalyst systems an α-methylstyrene monomer conversion of about 80 percent to about 85 is normally attained. In the case of cesium alkoxide and rubidium alkoxide containing catalyst systems an α-methylstyrene monomer conversion of at least about 90 percent and preferable at least 95 percent will be attained. The polymerization can then be terminated using a standard technique. The polymerization can be terminated with a conventional noncoupling type of terminator, such as water, an acid, a lower alcohol, and the like or with a coupling agent.

Solution α-methylstyrene-butadiene copolymer rubbers made by the process of this invention contain a fixed microstructure of 35 to 45 percent vinyl and 55 to 65 percent 1,4-isomeric structure, based upon butadiene repeat units. The α-methylstyrene repeat units are distributed throughout the rubbery copolymer in an essentially random manner with only slight tapering of the α-methylstyrene repeat units once all of the 1,3-butadiene monomer has been exhausted. In fact, 50 percent to 80 percent of the repeat units which are derived from α-methylstyrene are in blocks which contain only one repeat unit. It is preferred for α-methylstyrene-butadiene rubbers for tire tread compounds to contain from about 30 percent to about 50 percent α-methylstyrene and from about 50 percent to 70 percent butadiene. It is more preferred for such polymers to contain from about 35 percent to about 45 percent α-methylstyrene and from about 55 percent to about 65 percent butadiene.

The rubbers which are made by utilizing the techniques of this invention in solution polymerizations can be recovered utilizing conventional techniques. It may be desirable to add antioxidants to the polymer solution in order to protect the polydiene rubber produced from potentially deleterious effects of contact with oxygen. The rubber made can be precipitated from the polymer solution by the addition of lower alcohols, such as isopropyl alcohol, to the polymer solution. The rubbery polymer can be recovered from the solvent and residue by means such as decantation, filtration, centrification, and the like. Steam stripping can also be utilized in order to remove volatile organic compounds from the rubber.

There are valuable benefits associated with utilizing the rubbery polymers of this invention in making tire tread compounds. Such tire tread compounds are blends of the rubbery polymers of this invention with one or more additional sulfur curable elastomers. For instance, the α-methylstyrene-butadiene rubbers of this invention can be blended with natural rubbers and, optionally, high cis 1,4-polybutadiene and/or styrene-butadiene rubbers in making tire tread compounds. Such blends will normally contain from about 20 weight percent to about 80 weight percent of the α-methylstyrene-butadiene copolymer rubber and from about 20 weight percent to about 80 weight percent of the other sulfur curable rubber.

One particularly preferred tire tread compound is comprised of, based on 100 parts by weight of rubber, (a) from about 30 parts to about 50 parts of the α-methylstyrene-butadiene copolymer rubber, and (b) from about 50 parts to about 70 parts of natural rubber. It is most preferred for this tire tread compound to contain, based on 100 parts by weight of rubber, (a) from about 35 parts to about 45 parts of the α-methylstyrene-butadiene copolymer rubber, and (b) from about 55 parts to about 65 parts of natural rubber.

Another representative example of a tire tread compound which can be made with the α-methylstyrene-butadiene copolymer rubber of this invention is comprised of, based on 100 parts by weight of rubber, (a) from about 30 parts to about 40 parts of the α-methylstyrene-butadiene copolymer rubber, and (b) from about 20 parts to about 50 parts of natural rubber, (c) from about 10 parts to about 40 parts of styrene-butadiene rubber, and (d) from about 0 parts to about 50 parts of high cis-1,4-polybutadiene rubber.

Such tire tread compounds can further contain a silica filler. A combination of carbon black and silica can be employed. For instance, a combination of about 30 parts to about 80 parts of carbon black with about 10 parts to about 40 parts of silica can be usefully employed in such blends. The weight ratio of silica to carbon black will normally be at least 1:1. It is generally preferred for the weight ratio of silica to carbon black to be at least 4:1.

In some cases it will be preferred to utilize blends which contain from about 60 parts to 100 parts of silica and essentially no carbon black. In such cases it is more preferred for the blends to contain from 60 parts to 80 parts of silica. Even though these blends contain essentially no carbon black as filler, it is contemplated that a small amount of carbon black will be incorporated into the blends as a black color imparting agent or used as a carrier for chemical additives, such as coupling agents. Generally, the amount of carbon black needed for color imparting purposes will be less than 10 parts per 100 parts of rubber in the blend and will typically be less than 5 part per 100 parts of rubber in the blend.

These α-methylstyrenated rubber containing blends can be compounded utilizing conventional ingredients and standard techniques. For instance, the styrene-isoprene rubber containing blends will typically be blended with carbon black and/or silica fillers, sulfur, accelerators, oils, waxes, scorch inhibiting agents and processing aids. In most cases, the styrene-isoprene containing rubber blends will be compounded with sulfur and/or a sulfur containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally from 10 to 150 phr of at least one filler will be utilized in the blend with 30 to 95 phr being preferred. In most cases, at least some carbon black will be utilized in the filler. The filler can, of course, be comprised totally of carbon black. Silica can be included in the filler to improve tear resistance and heat build-up. Clays and/or talc can be included in the filler to reduce cost.

The commonly employed siliceous pigments used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930). The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc. The PPG Hi-Sil silicas are currently preferred.

The blend will also normally include from 0.1 to 2.5 phr of at least one accelerator with 0.2 to 1.5 phr being preferred. Antidegradants, such as antioxidants and antiozonants, will generally be included in the blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The SIR containing blends of this invention will also normally contain from 0.5 to 10 phr of zinc oxide with 1 to 5 phr being preferred. These blends can optionally contain from 0 to 10 phr of tackifier resins, 0 to 10 phr of reinforcing resins, 1 to 10 phr of fatty acids, 0 to 2.5 phr of peptizers, and 0 to 1 phr of scorch inhibiting agents.

The rubber blends of this invention can be used in tire treads in conjunction with ordinary tire manufacturing techniques. Tires are built utilizing standard procedures with the rubbery polymers of this invention simply being substituted for the rubber compounds typically used as the tread rubber. After the tire has been built with the blend of this invention, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 14 minutes with a cure cycle of about 12 minutes being most preferred.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

In this experiment, the homopolymerization of 1,3-butadiene monomer was carried out in a gallon (4.55 liter) batch reactor equipped with an air driven stirrer, nitrogen lines, water cooled coils, a rupture disk, and dump tank as well as a solenoid controller to protect against temperature surges. The reactor had been previously conditioned for anionic polymerization (purged with dry nitrogen). To this reactor was added 2000 grams of 14.6% 1,3-butadiene in hexane solution. The initial concentration was determined by gas chromatography (GC) analysis to be 14% solids. The reactor contents were adjusted to the reaction temperature of 65° C. and were equilibrated.

The catalyst contents were determined based on the dibutylmagnesium. The dibutylmagnesium necessary to produce a 350,000 g/mole polymer was 1.15 ml of 0.73M dibutylmagnesium solution in hexane. A molar ratio or 4/1 sodium amylate/dibutylmagnesium was desired, so 3.35 ml of 1.0M sodium amylate in hexane were measured. The charged reactor was then catalyzed in the following manner: first, 0.3 ml of 0.73M dibutylmagnesium solution in hexane was introduced followed by a hexane rinse and a trace of 1.0M sodium amylate in hexane, which was sufficient to scavenge any air or impurities in the system. If it had been necessary, additional dibutylmagnesium volumes would have been added until some reaction was detected using UV FORS. The catalytic amount of sodium amylate was added, followed by the dibutylmagnesium. All reagents were previously titrated for active ingredients.

The reactor was allowed to stir isothermally for 4.5 hours until complete conversion was achieved, as indicated by GC analysis of unconverted monomer. Upon complete conversion, the contents (polymer plus solvent) were passed into a one-gallon polypropylene jug under nitrogen. The polymer cement was stabilized with antioxidants as needed. After the polymer was dried, it was submitted for DSC, GPC, Mooney viscosity and NMR analysis. This analysis synthesized had a glass transition temperature (Tg) of −73.18° C., a Mooney ML-4 viscosity of 120, a trans content of 38 percent, a cis content of 24 percent, a 1,2-isomer content of 38 percent, a weight average molecular weight of 613,000 and a ratio of weight average molecular weight to number average molecular weight (Mw/Mn) of 1.9.

EXAMPLE 2

The procedure in Example 1 was repeated for various sodium amylate/dibutylmagnesium ratios and at various polymerization temperatures. In some reactions, propylene was added to the reactor; while slowing the reaction rate, this addition seemed to improve processability. The polybutadiene results are outlined in Table 1.

TABLE 1

| NaOAm/ $MgR_2$ | Temp, °C. | Propylene ppm | Tg, °C. | Mooney ML-4 | % Trans | % Cis | % 1,2 | Mw $\times 10^{-3}$ | Mw/Mn |
|---|---|---|---|---|---|---|---|---|---|
| 0.5/1 | 65 | 40 | −81.61 | — | 37 | 33 | 30 | 409 | 1.73 |
| 1/1 | 65 | 0 | −78.39 | 130 | 38 | 32 | 30 | 430 | 1.47 |
| 1/1 | 65 | 40 | −79.17 | 70 | 27 | 42 | 31 | 267 | 1.41 |
| 2/1 | 65 | 40 | −73.95 | 85 | 60 | 60 | 40 | — | — |
| 2/1 | 65 | 40 | −74.26 | 58 | 36 | 25 | 39 | 283 | 1.92 |
| 2/1 | 65 | 40 | −72.87 | 103 | 36 | 24 | 40 | 331 | 1.56 |
| 2/1 | 65 | 0 | −75.21 | 129 | 38 | 27 | 35 | 526 | 1.71 |
| 4/1 | 65 | 40 | −69.29 | 96 | 31 | 22 | 47 | — | — |
| 2/1 | 55 | 40 | −59.93 | 84 | 30 | 18 | 52 | 316 | 1.5 |
| 2/1 | 75 | 40 | −76.01 | 63 | 38 | 27 | 35 | 232 | 1.52 |
| 2/1 | 80 | 40 | −76.13 | 128 | 37 | 27 | 36 | 385 | 1.72 |

The term NaOAm represents sodium amylate and MgR$_2$ represents dibutylmagnesium. Thus in Table 1 NaOAm/MgR$_2$ represents the ratio of sodium amylate to dibutylmagnesium. The temperatures shown in the second column of Table 1 are the polymerization temperatures which were utilized. The third column in Table 1 provides the amount of propylene which was present during the polymerization. The term Tg represents the glass transition temperature of the polymer synthesized. The Mooney ML-4 viscosity, trans-isomer content, cis-isomer content, vinyl (1,2-) isomer content, weight average molecular weight (Mw), and ratio of weight average molecular weight to number average molecular weight (Mw/Mn) for the polymers made is also reported in Table 1.

EXAMPLE 3

Substituting potassium amylate and TMEDA for sodium amylate, a similar polybutadiene is produced. The procedure outlined in Example 1 was used to produce the polymers outlined in Table 2.

TABLE 2

| KOAm/ TMEDA/ MgR$_2$ | Tg, °C. | ML-4 | % Trans | % Cis | % 1,2 | MW | Mw/Mn |
|---|---|---|---|---|---|---|---|
| 2/2/1 | −71.9 | 97 | 42 | 19 | 39 | 434K | 2.14 |
| 2/4/1 | −71 | 100 | 42 | 19 | 39 | 478K | 2.3 |
| 2/2/1 | −74.5 | 96 | 43 | 21 | 36 | — | — |
| 4/2/1 | −73.1 | 102 | 41 | 21 | 38 | 459K | 2.2 |
| 2/2/1 | −75.2 | 104 | 44 | 22 | 34 | 442K | 2.17 |
| 2/2/1 | −73.4 | 96 | 45 | 21 | 34 | 449K | 2.26 |
| 2/2/1 | −73.7 | 126 | 43 | 21 | 36 | 470K | 2 |
| 2/2/1 | −73.2 | 49 | 42 | 21 | 37 | 248K | 1.86 |

EXAMPLE 4

A copolymer of styrene and butadiene was produced using the sodium amylate and dibutylmagnesium. To the reactor was added 1702 grams of 14.1 percent butadiene solution in hexane and 245 grams of 22.5 percent styrene solution in hexane to yield a polymer with a 19/81 styrene/butadiene composition. The procedure outlined in Example 1 was used, with 1.15 ml of 0.73M dibutylmagnesium in hexane and 1.68 ml of 1.0M sodium amylate in hexane used as the catalyst. To remove any impurities, 0.4 ml of 0.73M dibutylmagnesium was added followed by an additional 0.2 ml before any reaction was detected. The reaction was followed using GC analysis and it was apparent that the styrene and butadiene are randomly incorporated with this catalyst. Polymer characterization is given in Table 3.

Sodium amylate produces a unique styrene-butadiene rubber when used in conjunction with dibutylmagnesium. The sodium amylate produces random styrene incorporation as shown by GC analysis of converted monomer in contrast to potassium amylate, which blocks the styrene at the beginning of the reaction, and lithium alkyls, which blocks the styrene at the end of the reaction. Even in the presence of TMEDA, the sodium amylate with dibutyl magnesium still results in random styrene incorporation. However, the addition of TMEDA to the system increases the vinyl content and the glass transition temperature is much higher, as seen in Table 3.

EXAMPLE 5

The procedure in Example 4 was followed to make additional styrene/butadiene copolymers of different ratios or utilizing a potassium amylate/TMEDA/dibutylmagnesium catalyst. The results are listed in Table 3. A conversion of virtually 100 percent was achieved in this series of experiments. Unlike the SBR described in Example 4, this polymer exhibits some styrene blockiness.

TABLE 3

| St/Bd[1] | Tg, °C. | ML-4 | % St[2] | % 1,2 | % 1,4[3] | MW | Mw/Mn |
|---|---|---|---|---|---|---|---|
| 20/80 | −60.3 | 133 | 19 | 27 | 54 | 629K | 1.79 |
| 10/90 | −65.6 | — | 11 | 32 | 57 | 426K | 1.75 |
| 10/90 | −66.4 | 138 | 11 | 32 | 57 | 433K | 1.55 |
| 30/70 | −46.4 | 137 | 30 | 25 | 45 | 574K | 3.06 |
| 10/90 | −69.8 | 68 | 10 | 34 | 56 | 410K | 2.45 |
| Using NaOAm/TMEDA/MgR$_2$ | | | | | | | |
| 30/70 | −35 | — | — | — | — | — | — |
| 40/60 | −15.5 | — | — | — | — | — | — |
| Using 2/2/1 KOAm/TMEDA/MgR$_2$: | | | | | | | |
| 10/90 | −69.8 | 68 | 10 | 34 | 56 | 410K | 2.45 |

[1]- St represents styrene and Bd represents 1,3-butadiene. Thus, St/Bd is the ratio of styrene to butadiene in the copolymer.
[2]- % St represents the percentage of bound styrene in the copolymer.
[3]- % 1,4 represents the percentage of 1,4-isomer microstructure in the copolymer.

EXAMPLE 6

Similarly to the styrene/butadiene copolymers prepared in Example 5, other copolymers can be produced. Isoprene/butadiene and styrene/isoprene copolymers were produced using the general polymerization procedure outlined in Example 1 and modified for copolymers in Example 4. The results for these two copolymer types, with their ratios and the catalyst used, are outlined in Tables 4 and 5. The isoprene/butadiene from potassium amylate/TMEDA/dibutylmagnesium tends to be blocky.

TABLE 4

| Isoprene/ Bd | Tg | ML-4 | % 1,2 Bd | % 1,4 Bd | % 1,2 PI[1] | % 1,4 PI[2] | % 3,4 PI[3] |
|---|---|---|---|---|---|---|---|
| Using 2/1 NaOAm/MgR$_2$: | | | | | | | |
| 50/50 | −58.6 | 53 | 18 | 33 | 2 | 34 | 21 |
| 30/70 | −66.1 | 60 | 28 | 46 | 1 | 13 | 12 |
| Using 2/2/1 KOAm/TMEDA/MgR$_2$: | | | | | | | |
| 30/70 | −67.2 | 72 | — | — | — | — | — |

[1]- % 1,2 PI represents the percentage of polyisoprene repeat units which are of the 1,2-isomeric structure.
[2]- % 1,4 PI represents the percentage of polyisoprene repeat units which are of the 1,4-isomeric structure.
[3]- % 3,4 PI represents the percentage of polyisoprene repeat units which are of the 3,4-isomeric structure.

TABLE 5

| Styrene/ Isoprene | Ratio[1] | Tg | ML-4 | % St Block[2] | % St Random[3] | % 1,2 PI | % 1,4 PI | % 3,4 PI |
|---|---|---|---|---|---|---|---|---|
| Using NaOAm/MgR$_2$: | | | | | | | | |
| 10/90 | 1/1 | −37.4 | 37 | 0 | 11 | 2 | 58 | 29 |
| 10/90 | 2/1 | −37.8 | 54 | 0 | 11 | 3 | 53 | 33 |
| 15/85 | 2/1 | −36.4 | 66.5 | 3 | 14 | 2 | 50 | 31 |
| 15/85 | 2/1 | −33.8 | 44 | 12 | 6 | 4 | 45 | 33 |
| 20/80 | 2/1 | −39.6 | 59 | 5 | 17 | 3 | 46 | 29 |
| 20/80 | 2/1 | −43 | 15.5 | 10 | 8 | 4 | 49 | 29 |
| 25/75 | 2/1 | −52.9 | 49 | 7 | 20 | 2 | 44 | 27 |
| 25/75 | 2/1 | −26 | 43 | 10 | 20 | 4 | 32 | 32 |

TABLE 5-continued

| Styrene/ Isoprene | Ratio[1] | Tg | ML-4 | % St Block[2] | % St Random[3] | % 1,2 PI | % 1,4 PI | % 3,4 PI |
|---|---|---|---|---|---|---|---|---|
| Using KOAm/TMEDA/MgR₂: | | | | | | | | |
| 10/90 | 2/2/1 | −44.1 | <10 | 6 | 6 | 4 | 56 | 28 |
| 15/85 | 2/2/1 | −42.2 | 10 | 11 | 5 | 5 | 50 | 29 |
| 20/80 | 2/2/1 | −44.3 | 11 | 15 | 6 | 4 | 49 | 26 |

[1]- Ratio represents the ratio of sodium amylate to dibutylmagnesium or the ratio of sodium amylate to TMEDA to dibutylmagnesium.
[2]- % St Block is the approximate percentage of repeat units in the polymer which are comprised of styrene repeat units which are in polystyrene blocks.
[3]- % St Random is the approximate percentage of repeat units in the polymer which are comprised of styrene repeat units which are randomly distributed throughout the polymer.

EXAMPLE 7

Terpolymers containing Styrene, Isoprene and Butadiene can also be produced by the above procedures. Results are summarized in Table 6.

TABLE 6

| Styrene/ Isoprene/ Bd | NaOAm/ MgR₂ | Tg | Mooney | % St Blocks | % St Random | % 1,2 PBd | % 1,4 PBd | % 1,2 PI | % 1,4 PI | % 3,4 PI |
|---|---|---|---|---|---|---|---|---|---|---|
| 10/80/10 | 2/1 | −34.7 | 74 | 0 | 11 | 2 | 7 | 3 | 44 | 33 |
| 20/60/20 | 2/1 | −37.1 | 55 | 0 | 19 | 5 | 13 | 2 | 34 | 26 |

EXAMPLE 8

The copolymerization of α-methylstyrene and butadiene was carried out in a one-gallon batch reactor equipped with an air-driven stirrer, nitrogen lines, water-cooled coils, a rupture and dump tank as well as a solenoid controller to protect against temperature surges. The reactor has been previously conditioned for anionic polymerization (purged with dry nitrogen). To this reactor was added 38.5 ml of 0.909 g/ml α-methyl-styrene solution in hexane and 1800 grams of 17.5 percent Bd solution in hexane were added to give a 10/90 ratio of α-methyl styrene/butadiene. The initial concentration was determined by GC analysis to be 18.3 percent solids. The reactor contents were adjusted to the reaction temperature of 65° C. and were equilibrated.

The catalyst contents were determined based on the dibutylmagnesium. The dibutylmagnesium necessary to produce a 350,000 grams/mole polymer was determined to be 1.35 ml of 0.73M dibutylmagnesium solution in hexane. A molar ratio or 2/2/1 potassium amylate/TMEDA/ dibutylmagnesium was desired, so 2.0 ml of 1M TMEDA in hexane and 2.3 ml of 0.86 potassium amylate in hexane were measured. The charged reactor was then catalyzed in the following manner: First, 0.3 ml of 0.73M dibutylmagnesium solution in hexane was introduced followed by a hexane rinse and a trace of 0.86M potassium amylate in hexane, which was sufficient to scavenge any air or impurities in the system. If it had been necessary, additional dibutylmagnesium volumes would have been added until some reaction was detected using UV FORS. The catalytic amounts of potassium amylate and TMEDA were added. Finally, the dibutylmagnesium was added. All reagents were previously titrated for active ingredients.

The reactor was allowed to stir isothermally for 3.5 hours until complete conversion was achieved, as indicted by GC analysis of unconverted monomer. From this GC analysis, the monomer conversion vs total conversion and the polymer composition vs conversion were also determined. Upon complete conversion, the contents (polymer plus solvent) were passed into a polypropylene one-gallon jug under nitrogen. The polymer cement was stabilized with antioxidants as needed. After the polymer was dried, it was submitted for DSC, GPC, Mooney viscosity and NMR analysis. The results are outlined in Table 7.

EXAMPLE 9

The procedure in Example 8 was repeated for various α-methyl styrene/butadiene ratios and the results are outlined in Table 7.

TABLE 7

| α-methyl Styrene/ Bd | KOAm/ TMEDA/ MgR₂ | Tg, °C. | ML-4 | % α-St | % 1,2 | % 1,4 | Mw | Mw/ Mn |
|---|---|---|---|---|---|---|---|---|
| 10/90 | 2/21 | −64.3 | 59 | 9 | 36 | 55 | 423K | 3.89 |
| 15/85 | 2/2/1 | −65.3 | 46 | 18 | 34 | 48 | 386K | 4.40 |
| 20/80 | 2/2/1 | −58.7 | 46 | 18 | 34 | 48 | 386K | 4.40 |
| 20/80 | 2/2/1 | −58.3 | 25 | 18 | 35 | 47 | 299K | 4.73 |
| 20/80 | 4/2/1 | −63.3 | 20 | 17 | 29 | 54 | 250K | 4.58 |

EXAMPLE 10

In this series of experiments the procedure outlined in Example 8 was used to synthesize various polymers with cesium 2-etylhexoxide being substituted for the potassium amylate employed in Example 8. A summary of the of the characterization of the copolymers of α-methylstyrene and butadiene synthesized in these experiments is provided in Table 8.

TABLE 8

| α-methyl Styrene/ Bd | CsOR[1]/ TMEDA/ MgR₂ | Tg, °C. | ML-4 | % α-St[2] | % 1,2 | % 1,4 | Mw | Mw/ Mn |
|---|---|---|---|---|---|---|---|---|
| 5/95 | 2/2/1 | −59 | 80 | 6 | 44 | 49 | — | — |
| 15/85 | 2/2/1 | −54 | 47 | 15 | 41 | 45 | — | — |
| 20/80 | 2/2/1 | −53 | 35 | 21 | 32 | 47 | 386K | 3.29 |
| 25/75 | 2/2/1 | −47 | 69 | 26 | 32 | 42 | — | — |
| 30/70 | 2/2/1 | −42 | 73.5 | 31 | 30 | 39 | 461K | 3.76 |
| 30/70 | 2/2/1 | −44 | 77 | 33 | 27 | 40 | 481K | 4.61 |
| 35/65 | 2/2/1 | −39 | 59 | 37 | 29 | 34 | — | — |

TABLE 8-continued

| α-methyl Styrene/ Bd | CsOR[1]/ TMEDA/ MgR$_2$ | Tg, °C. | ML-4 | % α-St[2] | % 1,2 | % 1,4 | Mw | Mw/ Mn |
|---|---|---|---|---|---|---|---|---|
| 40/60 | 2/2/1 | −32 | 95.5 | 42 | 26 | 32 | 512K | 3.45 |
| 45/55 | 2/2/1 | −31.6 | 50 | 43 | 22 | 35 | — | — |

[1]- CsOR represents cesium 2-ethylhexoxide.
[2]- % α-St represents the percentage of bound α-methylstyrene in the copolymer.

EXAMPLE 11

By including additional monomers with the α-methylstyrene and butadiene, terpolymers were produced using the general procedures in Example 8. In an experiment were 25/50/25 α-methyl styrene/isoprene/butadiene, the reactor was charged with 446 grams of 23.9 percent a-methylstyrene, 1330 grams of 16 percent isoprene and 584 grams of 18.2 percent butadiene. Following the procedure in example 8, 1.95 ml of 0.73M dibutylmagnesium was used to achieve a target molecular weight of 300,000 grams/mole. To achieve a 2/2/1 ratio of cesium 2-ethylhexoxide/TMEDA/dibutylmagnesium, 3.55 ml of 0.8M cesium 2-ethylhexoxide and 2.85 ml of 1M TMEDA were also measure. Initially, 0.5 ml of 0.73 dibutylmagnesium was added followed by a hexane rinse and a trace of cesium 2-ethylhexoxide to scavenge any impurities. This was not sufficient, so an additional 0.3 ml of 0.73M dibutylmagnesium was introduced to produce some reaction as indicated by the UV FORS. The polymerization process outlined in Example 8 was then followed, and conversion vs time, monomer conversion vs total conversion and polymer composition vs total conversion were monitored. Analysis showed that the terpolymer made had a Tg of −39° C. and a Mooney ML-4 viscosity of 18.5. The repeat units in the terpolymer while were derived from butadiene had a microstructure which was 13 percent 1,2-isomer and 11 percent 1,4 isomer. The repeat units in the terpolymer which were derived from isoprene had a microstructure which was 34 percent 1,4-isomer, 17 percent 3,4-isomer and 0 percent 1,2-isomer.

EXAMPLE 12

The same procedure outlined in Example 11 was used to produce a 20/10/70 terpolymer of a-methyl styrene, styrene and butadiene. In less than 40 minutes, a conversion of greater than 95 percent was attained. The terpolymer made had a Tg of −53° C. and a Mooney ML-4 viscosity of 68.

EXAMPLE 13

In this experiment a polymer which was comprised of 22% α-methylstyrene, 23% styrene, 15% isoprene, and 40% butadiene was synthesized using a cesium 2-ethylhexoxide/TMEDA/dibutylmagnesium catalyst system as described in Example 11 at a polymerization temperature of 65° C. The polymer produced had a glass transition temperature of −37° C.

EXAMPLE 14

Various ratios of α-methyl styrene/butadiene copolymers produced using cesium 2-ethylhexoxide/TMEDA/dibutylmagnesium catalyst systems were compounded in an internal mixer. A modified version of a tire tread compound made in Table 9 was used. Copolymer ratios of 20/80, 30/70 and 40/60 of α-methyl styrene/butadiene were evaluated in place of the 50 phr (parts per hundred parts of rubber) of styrene-butadiene rubber shown in Table 9. In another tire tread rubber blend which was evaluated a 20/10/70 terpolymer of α-methyl styrene-styrene-butadiene was also evaluated in place of the styrene-butadiene rubber. The compounded materials were analyzed by DSC and rheovibron for dynamic temperature characteristics. Based on storage modulus, loss modulus and tan δ at different temperatures obtained from the rheovibron analysis, the tire properties were predicted using mathematical models. The tire characteristics which were predicted are given in Table 11. The glass transition temperatures of the polymers evaluated are shown in Table 10.

TABLE 9

| Compound Formulation | phr |
|---|---|
| Styrene-butadiene rubber | 50 |
| cis-1,4-polyisoprene | 50 |
| Fillers | 61.75 |
| Antidegradants | 4.87 |
| Oils | 7 |
| Accelerators | 1.08 |
| Sulfur/sulfur donor | 3 |
| Activators | 5.5 |

TABLE 10

| Experimental Polymer | Tg1, °C. | Tg2, °C. |
|---|---|---|
| α-methylstyrene-Butadiene | | |
| 0 (Control) | −64.9 | — |
| 20/80 | −67.5 | — |
| 30/70 | −66.6 | −47.8 |
| 40/60 | −68.7 | −34.5 |
| α-methylstyrene/Styrene/Butadiene | | |
| 20/10/70 | −66.2 | −48.3 |

Note: The Tg of the pure experimental polymers is given in Table 3 and 5.

TABLE 11

| | Rolling | | Traction | |
|---|---|---|---|---|
| Exp Polymer | Resistance | Irregular Wear | @ 20 mph[1] | @ 40 mph[1] |
| α-methylstyrene/Butadiene | | | | |
| 0 (Control) | 9.1 +/− 0.3 | 6.8 +/− 0.5 | 76.1 +/− 0.7 | 66.5 +/− 0.6 |
| 20/80 | 9.1 +/− 0.3 | 7.3 +/− 0.5 | 75.7 +/− 0.7 | 66.0 +/− 0.6 |
| 30/70 | 9.6 +/− 0.3 | 4.5 +/− 0.3 | 78.3 +/− 0.6 | 69.2 +/− 0.5 |
| 40/60 | 9.9 +/− 0.2 | 3.4 +/− 0.2 | 79.2 +/− 0.5 | 70.5 +/− 0.5 |
| α-methylstyrene/Styrene/Butadiene | | | | |
| 20/10/70 | 9.5 +/− 0.3 | 4.9 +/− 0.4 | 78.1 +/− 0.6 | 68.9 +/− 0.6 |
| Values Predicted at 90% Confidence Limits | | | | |

[1]- The term "mph" represents miles per hour.

The rolling resistance, irregular wear, and traction characteristics predicted in Table 11 are given in dimensionless units. With respect to rolling resistance the lower the number the better the rolling resistance characteristics. In the case at hand, the tire tread compounds made with α-methylstyrene containing polymers had predicted rolling resistance characteristics which are essentially equivalent to those of the control.

With respect to irregular wear the lower the number the better. As can be seen from Table 11 the α-methylstyrene containing polymers generally showed improved irregular wear characteristics over those of the control. In fact, the tread compounds made with the α-methylstyrene-butadiene copolymer rubbers which contained 30 percent and 40 percent α-methylstyrene showed greatly improved irregular wear characteristics over the control. The data also predicted that the α-methylstyrene-styrene-butadiene rubber could greatly improve irregular wear characteristics.

With respect to traction, the higher the number the better. Traction characteristics were predicted at speeds of 20 mph (miles per hour) and 40 mph. As can be seen from Table 11 the α-methylstyrene containing polymers generally showed improved traction characteristics at both 20 mph and 40 mph over those of the control. In fact, the tread compounds made with the α-methylstyrene-butadiene copolymer rubbers which contained 30 percent and 40 percent α-methylstyrene showed significantly improved traction characteristics over the control. The data also predicted that the α-methylstyrene-styrene-butadiene rubber could greatly improve traction characteristics at both 20 mph and 40 mph.

EXAMPLE 15

Various α-methylstyrene-butadiene copolymers were also evaluated as partial replacements for solution styrene-butadiene rubber in tire tread rubber compounds. In this experiment α-methylstyrene/butadiene copolymers containing 20%, 30%, and 40% α-methylstyrene were evaluated in a compound containing carbon black, a sulfur cure system and antidegradants (a standand compound test recipe). The standard physical properties showed that the α-methylstyrene containing copolymers would lead to improvements in self adhesion and groove tear properties.

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic tire, said pneumatic tire having an outer circumferential tread where said tread is a sulfur cured rubber composition which is comprised of (a) a rubbery copolymer of α-methylstyrene and 1,3-butadiene made by a process which comprises copolymerizing α-methylstyrene monomer and 1,3-butadiene monomer in an organic solvent at a temperature which is within the range of about 60° C. to about 100° C. in the presence of a catalyst system which is comprised of (a) a dialkyl magnesium compound, (b) a cesium alkoxide containing from about 2 to about 12 carbon atoms, and (c) polar modifier; wherein the molar ratio of the cesium alkoxide to the dialkyl magnesium compound is within the range of about 6:1 to about 1:5, and wherein the molar ratio of the polar modifier to the dialkyl magnesium compound is within the range of about 10:1 to about 1:2; and (b) at least one additional rubbery polymer which is co-curable with the rubbery copolymer of α-methylstyrene and 1,3-butadiene.

2. A pneumatic tire as specified in claim 1, wherein the sulfur-cured rubber composition is comprised of, based on 100 parts by weight of rubber, (a) from about 20 parts to about 80 parts of the α-methylstyrene-butadiene rubber and (b) from about 20 parts to about 80 parts of the additional rubbery polymer which is co-curable with the rubbery copolymer of α-methylstyrene and 1,3-butadiene.

3. A pneumatic tire as specified in claim 1, wherein the sulfur-cured rubber composition is comprised of a silica filler.

4. A pneumatic tire as specified in claim 1, wherein the sulfur-cured rubber composition is further comprised of a combination of a silica filler and carbon black.

5. A pneumatic tire as specified in claim 4 wherein the sulfur-cured rubber composition contains from about 30 parts to about 80 parts carbon black and from about 10 parts to about 40 parts of silica.

6. A pneumatic tire as specified in claim 4 wherein the weight ratio of silica to carbon black is at least 1:1.

7. A pneumatic tire as specified in claim 4 wherein the weight ratio of silica to carbon black is at least 4:1.

8. A pneumatic tire as specified in claim 3 wherein the sulfur-cured rubber composition contains from about 60 parts to about 100 parts of silica.

9. A pneumatic tire as specified in claim 3 wherein the sulfur-cured rubber composition contains from about 60 parts to about 80 parts of silica.

10. A pneumatic tire as specified in claim 8 wherein the sulfur-cured rubber composition is further comprised of carbon black; wherein the carbon black is present at a concentration of less than 10 parts per 100 parts of rubber.

11. A pneumatic tire as specified in claim 10 wherein the carbon black is present at a concentration of less than 5 parts per 100 parts of rubber.

12. A pneumatic tire as specified in claim 1 wherein from 50 percent to 80 percent of the repeat units which are derived from α-methylstyrene in the rubbery copolymer of α-methylstyrene and 1,3-butadiene are in blocks of only one repeat unit.

13. A pneumatic tire as specified in claim 1 wherein the cesium alkoxide contains from about 3 to about 8 carbon atoms.

14. A pneumatic tire as specified in claim 1 wherein the dialkyl magnesium compound contains from 1 to about 12 carbon atoms.

15. A pneumatic tire as specified in claim 14 wherein the polar modifier is selected from the group consisting of diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N', N'-tetramethylethylenediamine, N-methyl morpholine, N-ethyl morpholine and N-phenyl morpholine.

16. A pneumatic tire as specified in claim 14 wherein the cesium alkoxide is cesium t-amyloxide.

17. A pneumatic tire as specified in claim 1 wherein the sulfur cured rubber composition is comprised of, based on 100 parts by weight of rubber, (a) from about 30 parts to about 50 parts of the α-methylstyrene-butadiene copolymer rubber, and (b) from about 50 parts to about 70 parts of natural rubber.

18. A pneumatic tire as specified in claim 1 wherein the sulfur cured rubber composition is comprised of, based on 100 parts by weight of rubber, (a) from about 35 parts to about 45 parts of the α-methylstyrene-butadiene copolymer rubber, and (b) from about 55 parts to about 65 parts of natural rubber.

19. A pneumatic tire as specified in claim 1 wherein the sulfur cured rubber composition is comprised of, based on 100 parts by weight of rubber, (a) from about 30 parts to about 40 parts of the α-methylstyrene-butadiene copolymer rubber, and (b) from about 20 parts to about 50 parts of natural rubber, (c) from about 10 parts to about 40 parts of styrene-butadiene rubber, and (d) from about 0 parts to about 50 parts of high cis-1,4-polybutadiene rubber.

* * * * *